United States Patent [19]

Paquette et al.

[11] Patent Number: 5,058,919

[45] Date of Patent: Oct. 22, 1991

[54] AIR BAG MODULE CONSTRUCTION AND ASSEMBLY TECHNIQUE

[75] Inventors: Scott L. Paquette, Auburn Hills; Jeffrey C. Synor, Utica; John W. Wiers, Romeo, all of Mich.

[73] Assignee: TRW Vehicle Safety Systems, Inc, Cleveland, Ohio

[21] Appl. No.: 539,023

[22] Filed: Jun. 15, 1990

[51] Int. Cl.$^5$ .............................................. B60R 21/08
[52] U.S. Cl. ...................................... 280/732; 280/743
[58] Field of Search ................. 280/728, 731, 732, 743

[56] References Cited

U.S. PATENT DOCUMENTS

| | | | |
|---|---|---|---|
| 3,708,179 | 1/1973 | Hulten | 280/732 |
| 3,801,126 | 4/1974 | Knight, IV et al. | 280/732 |
| 3,880,447 | 4/1975 | Thorn et al. | 280/731 |
| 3,930,664 | 1/1976 | Parr et al. | 280/732 |
| 3,938,826 | 2/1976 | Giorgini et al. | 280/732 |
| 4,111,457 | 9/1978 | Kob et al. | 280/728 |
| 4,153,273 | 5/1979 | Risko | 280/740 |
| 4,262,931 | 4/1981 | Strasser et al. | 280/729 |
| 4,332,398 | 6/1982 | Smith | 280/732 |
| 4,400,010 | 8/1983 | Stütz et al. | 280/732 |
| 4,696,705 | 9/1987 | Hamilton | 149/21 |
| 4,759,568 | 7/1988 | Paefgen et al. | 280/732 |
| 4,770,439 | 9/1988 | Maier et al. | 280/732 |
| 4,810,005 | 3/1989 | Föhn | 280/732 |

FOREIGN PATENT DOCUMENTS

2330194 12/1974 Fed. Rep. of Germany .
63-212147 2/1987 Japan .

Primary Examiner—Kenneth R. Rice
Attorney, Agent, or Firm—Calfee, Halter & Griswold

[57] ABSTRACT

An air bag module structure comprises a pair of subassemblies which are coupled together to form the module. The subassemblies comprise an air bag/cover subassembly and an inflator/reaction device subassembly. The air bag/cover subassembly comprises a cover with an air bag cavity, a folded air bag disposed within the cavity, and a retaining device connected directly to the cover to maintain the folded air bag within the cavity. The inflator/reaction device subassembly comprises an inflator with gas dispensing nozzles, and a reaction device with integrally formed structure for directly engaging the inflator and for coupling the inflator with the reaction device. The air bag/cover subassembly and the inflator/reaction device subassembly have respective integrally formed coupling structures for coupling the subassemblies together to form the air bag module.

31 Claims, 9 Drawing Sheets

FIG. 9

AIR BAG MODULE CONSTRUCTION AND ASSEMBLY TECHNIQUE

TECHNICAL FIELD

The present invention relates to an air bag module comprising a pair of subassemblies which are coupled together to form the module. One subassembly, referred to as an air bag/cover subassembly, comprises a cover having an air bag, a folded air bag within the cavity, and a retainer coupled directly to the cover to maintain the folded air bag within the cavity. The other subassembly, known as an inflator/reaction device subassembly, comprises an inflator and a reaction device. The reaction device includes integrally formed structure for directly engaging the inflator and for coupling the inflator to the reaction device. The subassemblies are separately formed, and then connected together to complete the air bag module.

BACKGROUND

A vehicle air bag module is a complete air bag unit which is assembled apart from the vehicle and then coupled as a unit with the vehicle. Typically, an air bag module includes (i) a reaction device, (ii) a folded air bag connected to the reaction device, (iii) an inflator, or gas generator, connected to the reaction device, and (iv) a cover connected to the reaction device to complete an enclosure for the folded air bag. The module is generally coupled with a structural part of the vehicle via the reaction device, and the cover may form a part of the vehicle interior which faces the passenger compartment. In the case of a passenger side air bag module, for example, the reaction device will usually be coupled with the support structure for the dashboard of the vehicle, and the cover of the module may form a part of the dashboard of the vehicle. Alternatively, in the case of a driver side air bag module, the reaction device may usually be coupled with the steering wheel support structure, and the cover of the module may form a part of the steering wheel cover.

When coupled with a vehicle, an air bag module operates to deploy an air bag at the onset of a vehicle collision. Specifically, at the onset of a collision, a chemical mixture in the inflator that forms part of the module is ignited to generate large quantities of gas under relatively high pressure. The cover is designed so that when such gas is generated in the module, portions of the cover can separate to create a deployment opening for the air bag. The gas simultaneously (i) forces the air bag through the deployment opening in the cover and (ii) inflates the air bag. As the air bag is being discharged and inflated, relatively high forces are applied to the various components of the air bag module. The reaction device will usually transmit such forces to the vehicle structure to stabilize the air bag module during deployment of the air bag.

Over the years, various techniques for forming air bag modules have been suggested. One well known technique comprises initially securing an air bag and an inflator with a reaction device, folding the air bag into a predetermined pattern relative to the inflator and the reaction device, and then attaching a cover to the reaction device. The reaction device is adapted to be coupled with a structural part of the vehicle, to couple the module with the vehicle. One example of such a technique is shown in U.S. Pat. No. 4,148,503, wherein an air bag module comprises an inflator and an air bag which are each bolted to a reaction device. The air bag is arranged to surround the inflator and is then received in a folded condition within a receiving case or cover. Another example of such a technique is shown in U.S. Pat. No. 4,842,300, wherein an air bag module comprises an inflator and an air bag which are each bolted to a reaction device. The air bag is folded into a predetermined pattern within the reaction device relative to the inflator, and a cover is then attached to the reaction device to complete the module.

Another known technique for forming an air bag module is initially to form a subassembly comprising a reaction device, a folded air bag and a cover, and to secure an inflator to the subassembly to complete the module. The subassembly is formed by folding the air bag into a predetermined configuration, and securing and closing the air bag within a covered reaction device to complete the subassembly. The inflator is then bolted to the subassembly to complete the air bag module. This technique minimizes the handling of inflators in assembling the module. Also, it enables inflators to be transported separately from the subassembly. Thus, if the chemical mixture in the inflators is accidentally ignited during transport, the subassemblies of the modules are not destroyed. An example of such a technique is shown in U.S. Pat. No. 4,153,273.

Still another known technique for forming an air bag module is disclosed in U.S. Pat. No. 4,915,410. A reaction device is initially coupled to a folded air bag and to a cover (preferably by means of bolts) to form a subassembly. An inflator is later secured to the subassembly, preferably by means of resilient bands which couple the inflator to the reaction device. By initially forming a subassembly without an inflator and later coupling the inflator to the subassembly, the handling of live inflators is minimized.

In the air bag industry, new and useful techniques for forming air bag modules are becoming increasingly important. Air bag modules are currently being installed in large numbers of automobiles. The number of air bag modules installed in the future will continue to increase, as consumer demand and federal regulatory requirements for vehicle safety also continue to increase. To enable auto makers to meet this growing demand, there is a continuing need for simple and effective techniques which lend themselves to the mass production of air bag modules.

Moreover, applicants believe there is a continuing need for air bag module structures and assembly techniques which (i) minimize the components required to construct the modules, (ii) reduce the weight of individual module components, (iii) reduce the costs and simplify the techniques for manufacturing such individual components, and (iv) simplify the techniques for assembling the modules. Additionally, it is important to allow inflators to be manufactured and transported separately from the remaining components of the modules, and incorporated into the modules as the last step in the assembly process. This minimizes the risk of damage to the remaining components of the modules, due to accidental ignition of an inflator.

Also, applicants believe there is a need for a lightweight module construction in which certain components of the module can be standardized for a number of vehicle makes and styles, and other components can be adapted for specific vehicle applications and environments. For example, in a passenger side air bag system, the cover of the module typically forms a part of the vehicle dashboard. Thus, the cover must be designed with an external configuration which matches the profile of the vehicle make and style. However, if other parts of a passenger side module are standardized to be used with covers of different external configurations, the manufacture of passenger side modules for vehicles of different makes and styles becomes more efficient.

SUMMARY OF THE PRESENT INVENTION

The present invention provides a new and useful air bag module structure and new and useful techniques for forming an air bag module. The invention provides an air bag/cover subassembly and an inflator/reaction device subassembly which are coupled together to form an air bag module. The subassemblies are separately assembled, and can be separately transported, to minimize the handling of inflators as compared to an assembly process in which inflators may be one of the first components of an air bag module to be incorporated into the module. The components which form the subassemblies are designed to be relatively simple and efficient to manufacture and assemble. Additionally, the subassemblies are designed with a number of components which can be standardized for use in forming modules for vehicles of different makes and styles. Further, the subassemblies are formed using relatively few components, and with integral coupling structure to eliminate the use of additional fasteners. The subassemblies are particularly designed with a view toward the mass production of air bag modules.

The air bag/cover subassembly of the present invention comprises a cover with an air bag cavity, a prefolded air bag disposed in the air bag cavity, and a retainer coupled directly to the cover and adapted to maintain the air bag in the cavity. The cover has an access opening for receiving the folded air bag, and side flanges to enable mounting of the module to the vehicle. Moreover, the cover has portions adapted to separate when gas under pressure is applied to the air bag, to create a deployment opening for the air bag. The prefolded air bag has a gas inlet opening with a relatively rigid border rim. The cover has integrally formed internal recess structure adapted to receive the relatively rigid border rim of the air bag to locate the air bag properly within the cavity and to retain the gas inlet opening of the air bag attached to the cover as the air bag is being deployed. The cover has additional integrally formed internal recess structure adapted to engage the retainer directly to couple the retainer to the cover.

The inflator/reaction device subassembly of the invention comprises an inflator which is adapted to contain a gas generating device, and a reaction device which has integrally formed structure adapted to engage the inflator directly and to couple the inflator with the reaction device. Specifically, the reaction device has an integrally formed, resiliently deflectable portion which deflects to enable the inflator to be properly oriented relative to the reaction device, and which then returns to a predetermined position, to retain the inflator coupled with the reaction device.

Each of the cover and reaction device is preferably formed of an injection moldable plastic. The plastic which forms the reaction device is particularly characterized by its resistance to the relatively high temperatures generated by the inflator during its operation. The plastic which forms the cover is particularly character- ized by (i) its ability to separate, under pressure, to form the deployment opening, (ii) its relative flexibility, and (iii) its impact resistance properties. Each of the cover and the reaction device has integrally formed coupling structure which enables those members to be directly coupled to each other, without the need for bolts or other types of fasteners. Thus, the subassemblies can be coupled together to form the module by coupling the reaction device to the cover.

Also, the air bag/cover subassembly can be formed and transported separately from the inflator/reaction device subassembly, and the subassemblies coupled together as the last step in the formation of the module. Moreover, the components for forming either subassembly can be separately transported and then assembled to form the subassembly at the time the module is being assembled. Thus, the handling and transportation of live inflators is minimized. Applicants believe the air bag module, and the techniques used to form the module components and subassemblies, are particularly suited for efficient and effective mass production of air bag modules.

Still further, the subassemblies are designed such that most of their components can be standardized for use in forming modules for vehicles of various makes and styles. This provides significant opportunity for increased efficiency and simplification of the techniques for manufacturing and assembling modules for vehicles of different makes and styles.

The various components of the module, and the materials they are formed of, are also designed to minimize module weight, which is a continuing objective in the automobile industry.

Further features and advantages of the present invention will become further apparent from the following detailed description and the accompanying drawings.

DETAILED DESCRIPTION OF THE PREFERRED EMBODIMENT

Figure 1:
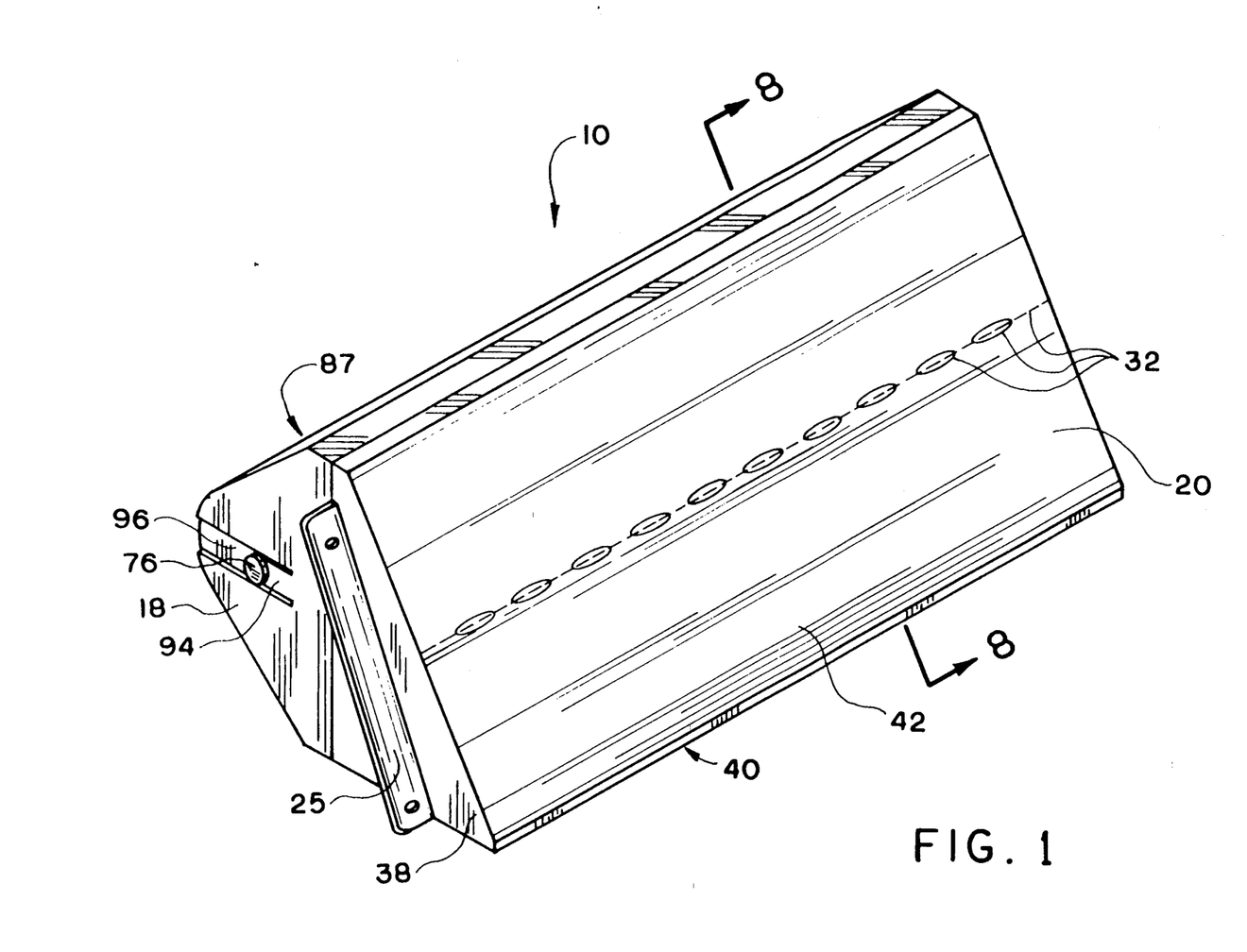
FIG. 1 is a schematic, three-dimensional illustration of a vehicle air bag module constructed according to the principles of the present invention.
Figure 8:
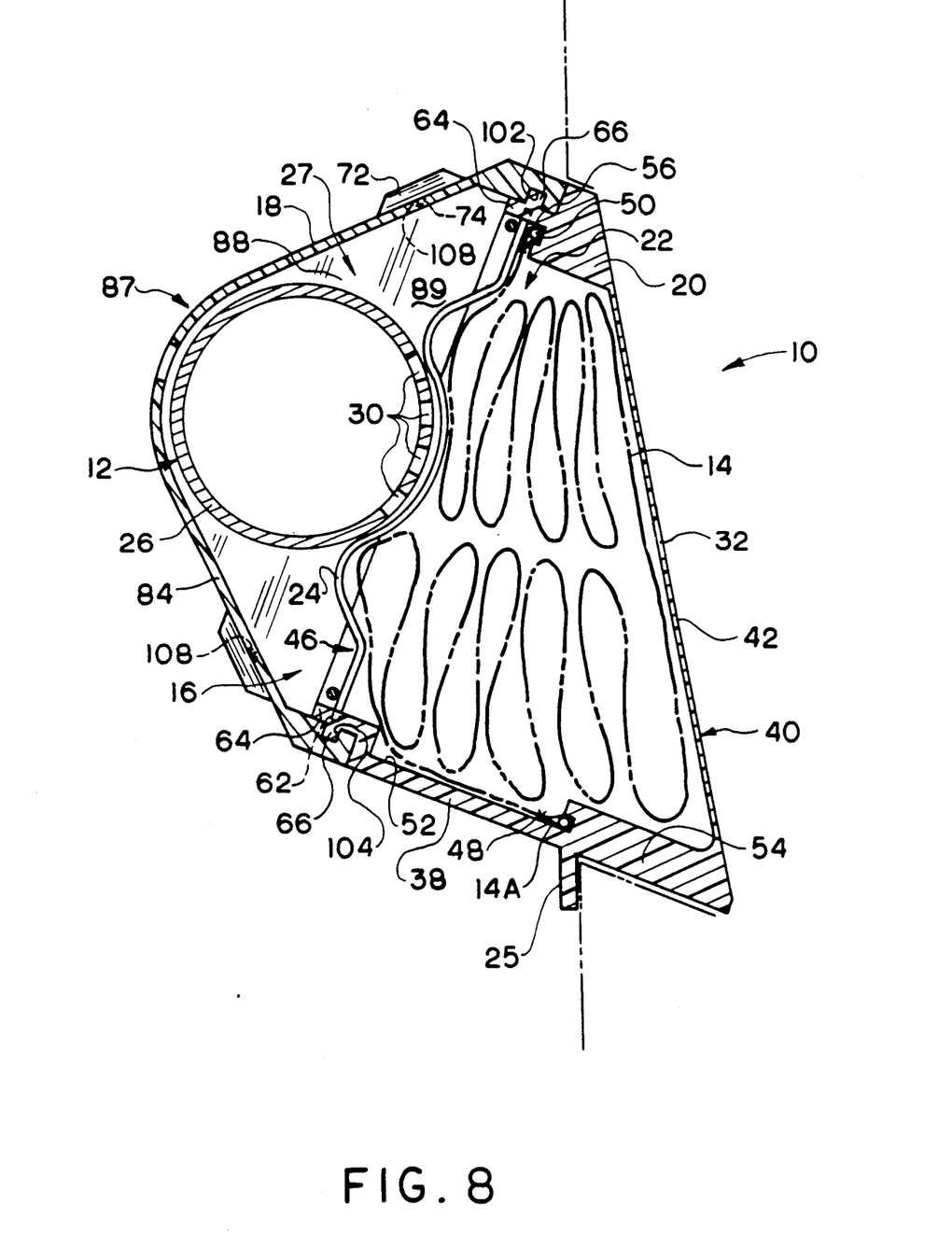
FIG. 8 is a sectional view of the vehicle air bag module of FIG. 1, taken from the direction 8—8.

FIGS. 1 and 8 schematically illustrate a vehicle air bag module 10 constructed according to the invention. The module 10 is designed for use in a passenger side air bag system, with the module incorporated into the dashboard of a vehicle, on the passenger side of the vehicle.

The air bag module 10 is a self-contained unit, the primary components of which include a gas generator or inflator 12, a folded air bag 14, and an enclosure 16 for the inflator 12 and the folded air bag 14. The enclosure 16 comprises a reaction can 18 and a cover 20. The inflator 12 is secured to the reaction can 18. The folded air bag 14 is disposed in a cavity 22 formed in the cover 20, and a retainer 24 holds the folded air bag 14 in the cavity 22. The module 10 is coupled to a structural portion of the vehicle, by means described hereinafter, so that forces applied to the module during inflation of the air bag are transmitted to the structural portion of the vehicle.

The inflator 12 includes a cylindrical housing 26 having a central axis 28. The cylindrical housing 26 contains a gas generating composition. Gas dispensing nozzles 30 are formed in the cylindrical housing 26 and are disposed in fluid communication with the interior of the folded air bag 14 when the air bag module 10 is assembled.

The gas generating composition inside the inflator 12 can have any of several compositions which are well known to those of ordinary skill in the art, and thus require no further explanation. One such composition is described in U.S. Pat. No. 4,817,828. In an emergency situation, the gas generating composition inside the inflator 12 is ignited by means of an ignition mechanism which forms no part of this invention. The gas generated within the inflator housing 26 is directed through the gas dispensing nozzles 30 into the interior of the air bag 14. The pressure of the gas against the air bag 14 causes the air bag 14 to expand and apply pressure against the cover 20. The pressure against the cover 20 causes portions of the cover to separate and to create a deployment opening for enabling the air bag to be deployed into the vehicle compartment. The cover 20 has appropriate slotted and/or scored portions 32, which are well known in the art, to enable the portions of the cover 20 to separate to create the deployment opening for the air bag 14.

Figure 9:
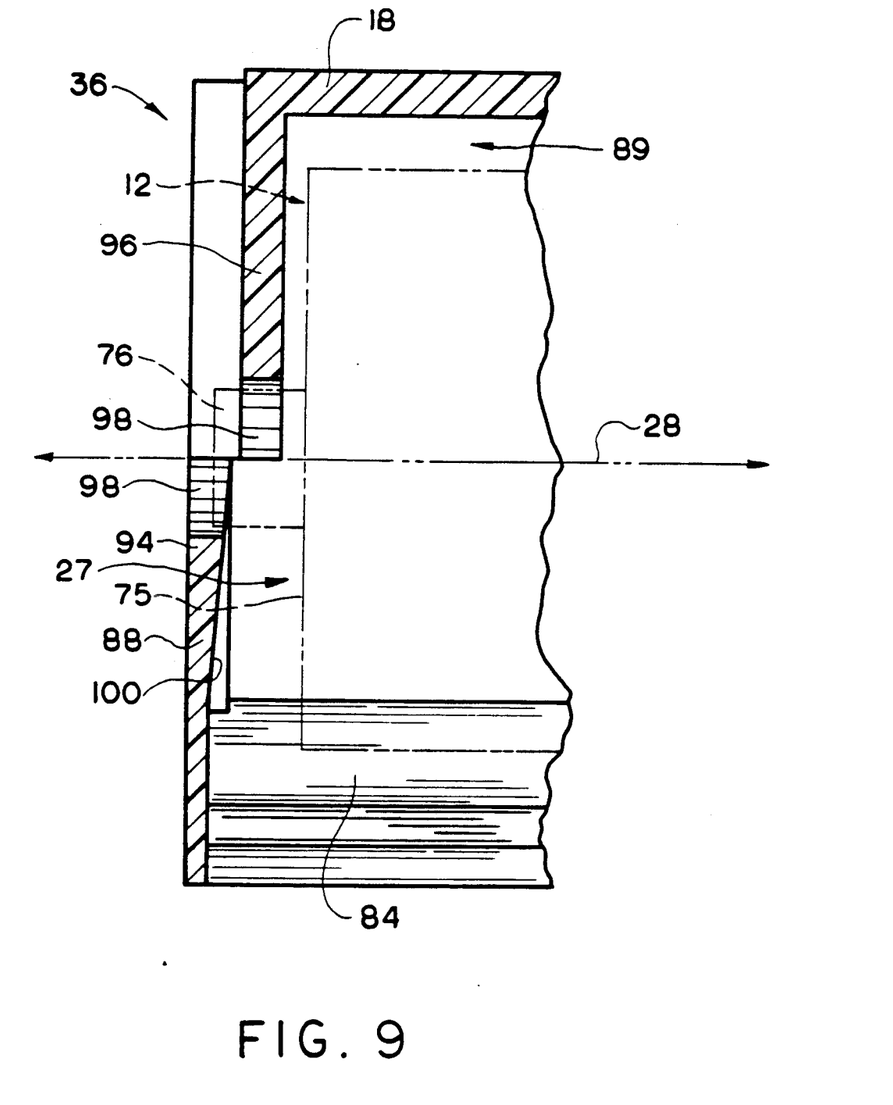
FIG. 9 is a sectional view of the inflator/reaction device subassembly of FIG. 3, taken from the direction 9—9, and showing the inflator in phantom.

The air bag module 10 is constructed of two subassemblies. One subassembly, the air bag/cover subassembly, generally referenced at 34 in FIGS. 6 and 7, consists of the folded air bag 14, the cover 20, and the retainer 24 for maintaining the air bag within the cavity 22 formed in the cover 20. The other subassembly, the inflator/reaction device subassembly, generally referenced at 36 in FIGS. 3 and 9, consists of the inflator 12 and the reaction can 18.

Figure 6:
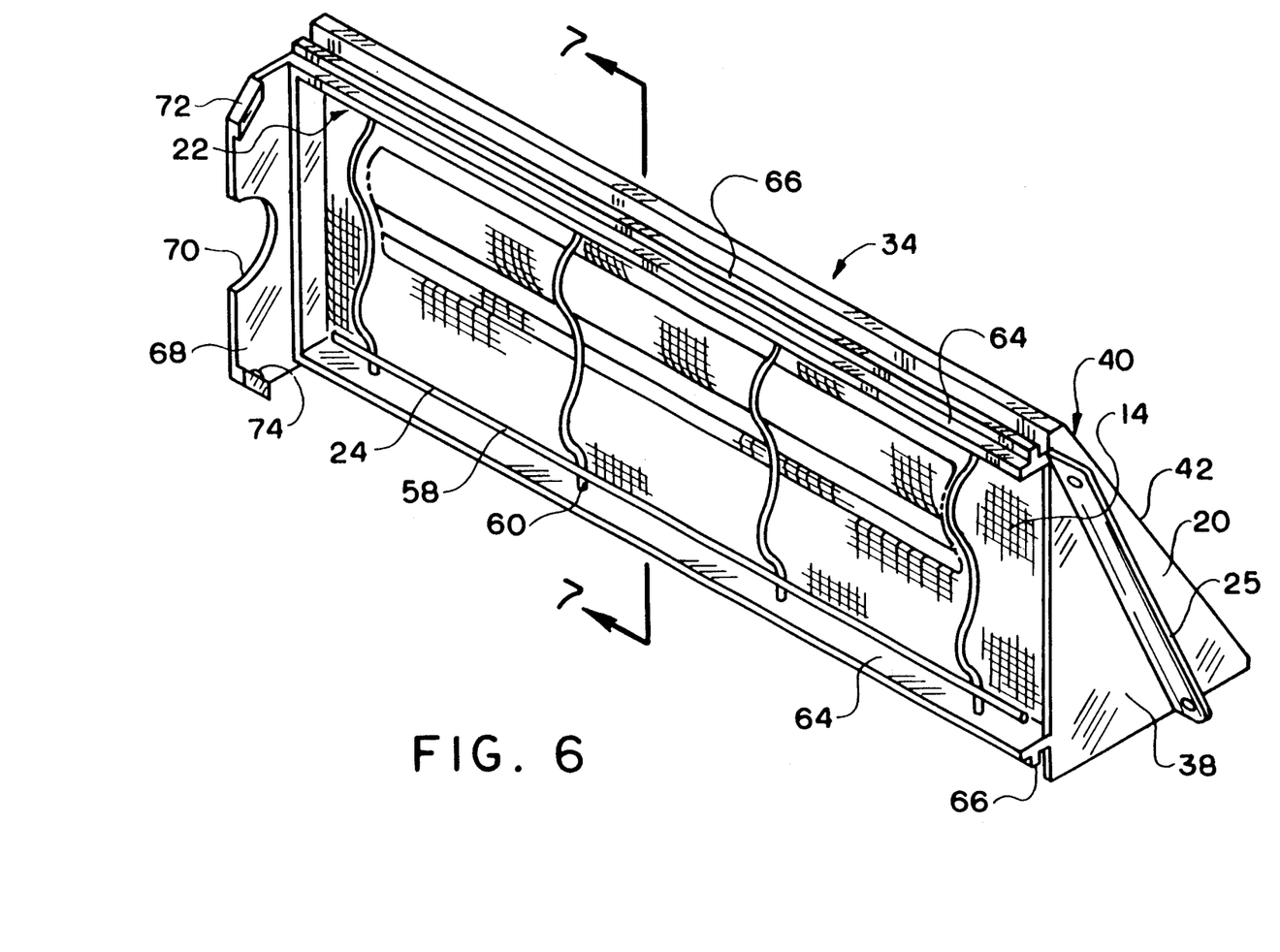
FIG. 6 is a three-dimensional view of an air bag/cover subassembly constructed according to the principles of the present invention, taken at an angle from the rear side of the air bag/cover subassembly.

In the air bag/cover subassembly 34, as shown in FIG. 6, the cover 20 includes a main body 38 with a closed end 40 and an open end defining an access opening 46. The closed end 40 has the scored portions 32 formed therein. In a passenger side air bag system, the closed end 40 of the cover 20 may form part of the vehicle dashboard which faces the passenger compartment of the vehicle. Alternatively, the cover may be immediately behind the dashboard. Where the cover forms part of the dashboard, the closed end 40 of the cover 20 has an outer surface 42 which matches the profile of the dashboard of the vehicle.

The cover 20 is hollow and defines the cavity 22 for housing the air bag 14. The access opening 46 allows insertion of the prefolded air bag 14 into the cavity 22. The retainer 24 is adapted to be directly coupled to the cover 20, after the prefolded air bag 14 has been properly located in the cavity 22. The retainer 24 maintains the folded air bag 14 in the cavity 22.

Figure 5:
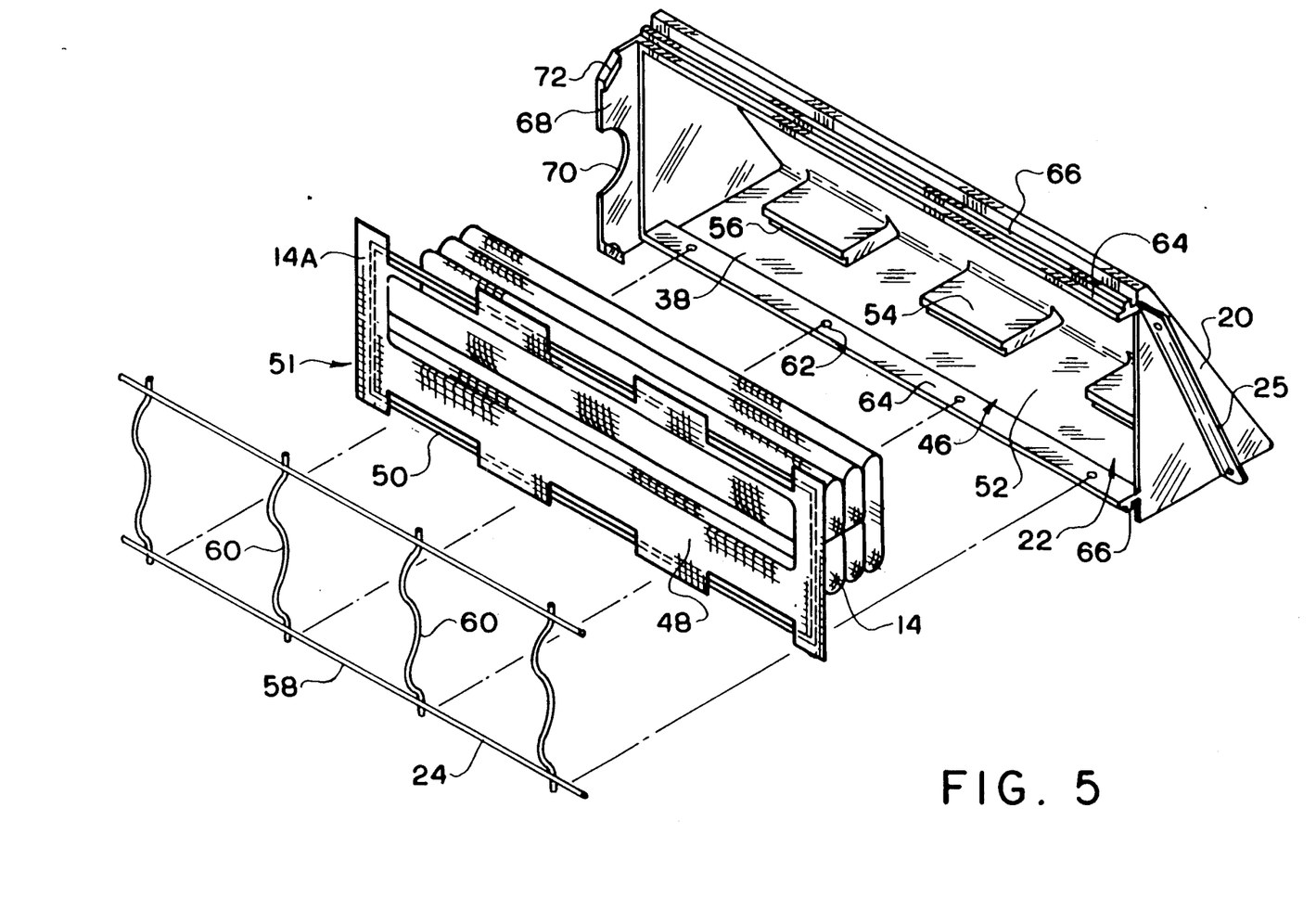
FIG. 5 is an exploded three-dimensional view of the elements forming the air bag/cover subassembly of a module according to the invention.
Figure 7:
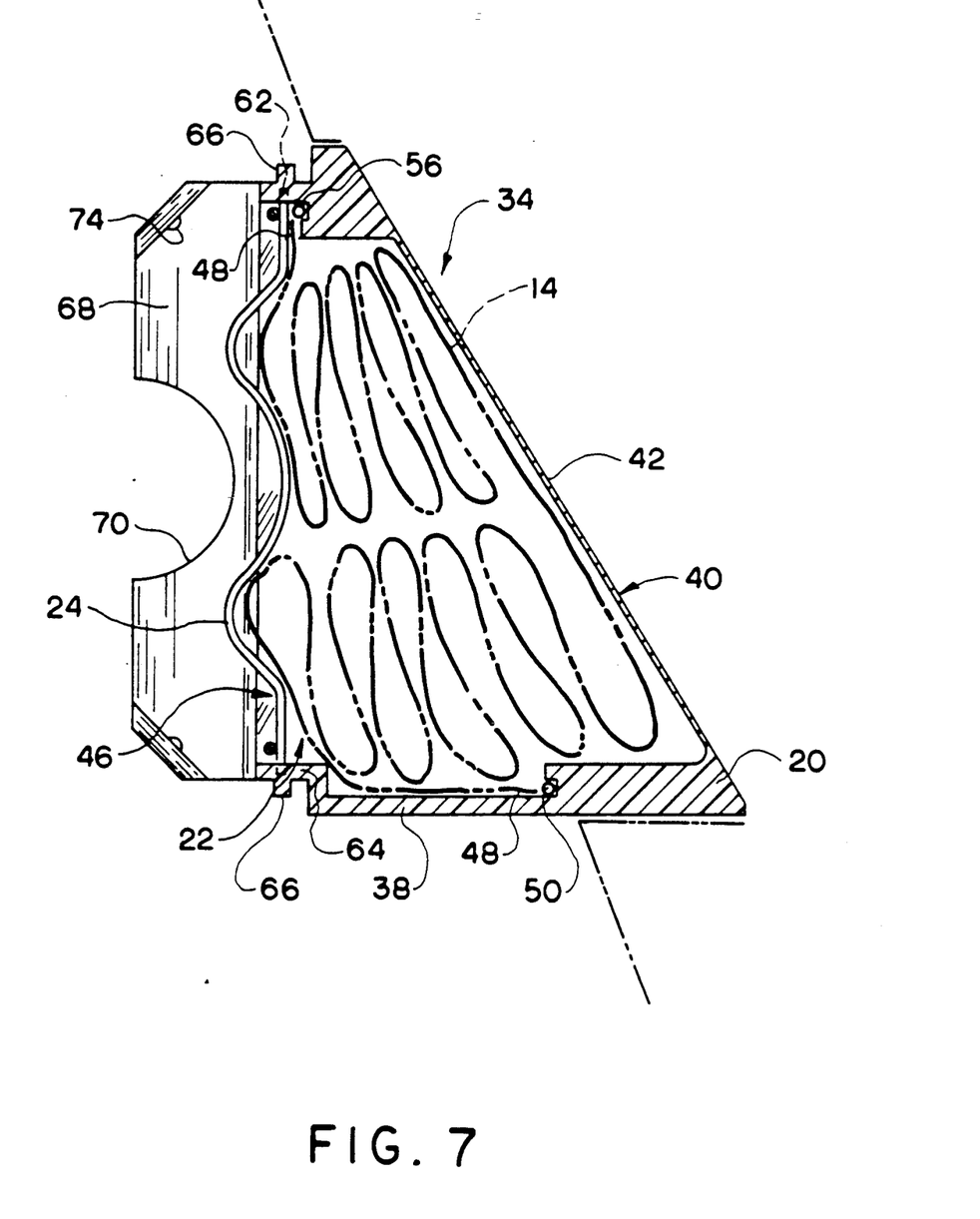
FIG. 7 is a sectional view of the air bag/cover subassembly of FIG. 6, taken from the direction 7—7.

The air bag 14 is made of porous, woven fabric or an impermeable material, such as plastic film. As illustrated in FIGS. 5 and 7, the air bag 14 is formed with a gas inlet opening 48, through which gas generated by the inflator 12 passes during operation of the air bag module. A relatively rigid rod 50 is connected with a portion of the air bag 14 which borders the gas inlet opening 48. The relatively rigid rod 50 extends substantially about the gas inlet opening 48, and is coupled to the air bag 14 by means of sections 14A of the air bag which are folded over the rod 50, and then connected (e.g., sewn) to each other to capture the rod 50. The rod 50 defines a relatively rigid border rim 51 at the gas inlet opening 48 of the air bag 14.

The cover 20 has an internal wall 52 with integrally formed structure for engaging the rigid border rim 51 of the folded air bag 14. The internal wall 52 of the cover has a series of integrally formed raised portions 54, which are preferably formed in one piece with the cover. Each raised portion 54 defines a U-shaped recess 56 which faces the access opening 46 in the cover 20. The U-shaped recesses 56 are dimensioned to receive the relatively rigid border rim 51 of the air bag 14 in relatively tight fitting engagement.

The retainer 24 is a screen-shaped member having a series of main strands 58 and a series of flexible cross strands 60. The main strands 58 are relatively straight. The cross strands 60 each have a wave-like configuration, so as to provide the retainer 24 with flexibility in a direction transverse to the main strands 58, and to accommodate positioning adjacent the cylindrical housing 26 of the inflator 12. The cross strands 60 have end portions adapted to be received in spaced apart internal recesses 62 in a pair of flanges 64 which are integral and preferably formed in one piece with the cover 20, to enable the retainer 24 to be directly coupled to the cover 20. In an assembled module, the retainer 24 is disposed between the inflator 12 and the folded air bag 14, and assists in preventing direct contact between the air bag 14 and a hot inflator 12 during operation of the module (see FIG. 8).

In assembling the air bag/cover subassembly 34, the air bag 14 is initially prefolded to a predetermined configuration outside the cover 20 (see FIG. 5). The prefolded air bag 14 is then inserted as a unit into the cavity 22 defined within the cover 20. The cover 20 is preferably made of a tough and relatively flexible plastic, having impact resistance properties, such as a plastic manufactured and sold by General Electric Company of Schenectady, N.Y., under the tradename "Ultem". The prefolded air bag 14 is inserted into the cavity 22 in such a manner that portions of the relatively rigid border rim 51 of the air bag are received in respective U-shaped recesses 56 inside the cover 20.

The retainer 24 is then coupled directly to the cover 20, by inserting the ends of the cross strands 60 into the internal recesses 62 in the flanges 64 on the cover 20. The original length of the cross strands 60 is designed to be greater than the spacing between the flanges 64, so that the retainer must be compressed slightly to enable the cross strands 60 to be inserted into the recesses 62. The retainer 24 is preferably formed of a flexible material, such as spring metal, which may be flexed into coupling engagement with the cover. Hence, as the retainer 24 is coupled to the cover, internal biasing forces are created which continuously bias the cross strands 60 into the recesses 62, to maintain the retainer 24 firmly engaged with the cover 20.

Because of the nature of the retainer 24, it can be securely attached to a range of covers for which the access openings vary in length over a predetermined range. Moreover, the foregoing structure and assembly technique can be used with covers having different external profiles, but having a standardized internal layout of (i) U-shaped recesses (56) for engaging the relatively rigid border rim 51 of a folded air bag 14, (ii) spaced apart internal recesses (62) for engaging the cross strands 60 of the retainer member 24, and (iii) spaced apart flanges (64) for coupling the cover with the reaction can 18. Thus, air bag/cover assemblies 34 for different makes and styles of vehicles can be constructed with a standard air bag folding and attachment configuration, a standard size retainer 24, and a cover 20 for which the external profile varies but for which the internal configuration has a standardized pattern of (i) U-shaped recesses (56), (ii) spaced apart, internal recesses (62), and (iii) spaced apart flanges (64), as set forth herein.

Figure 4:
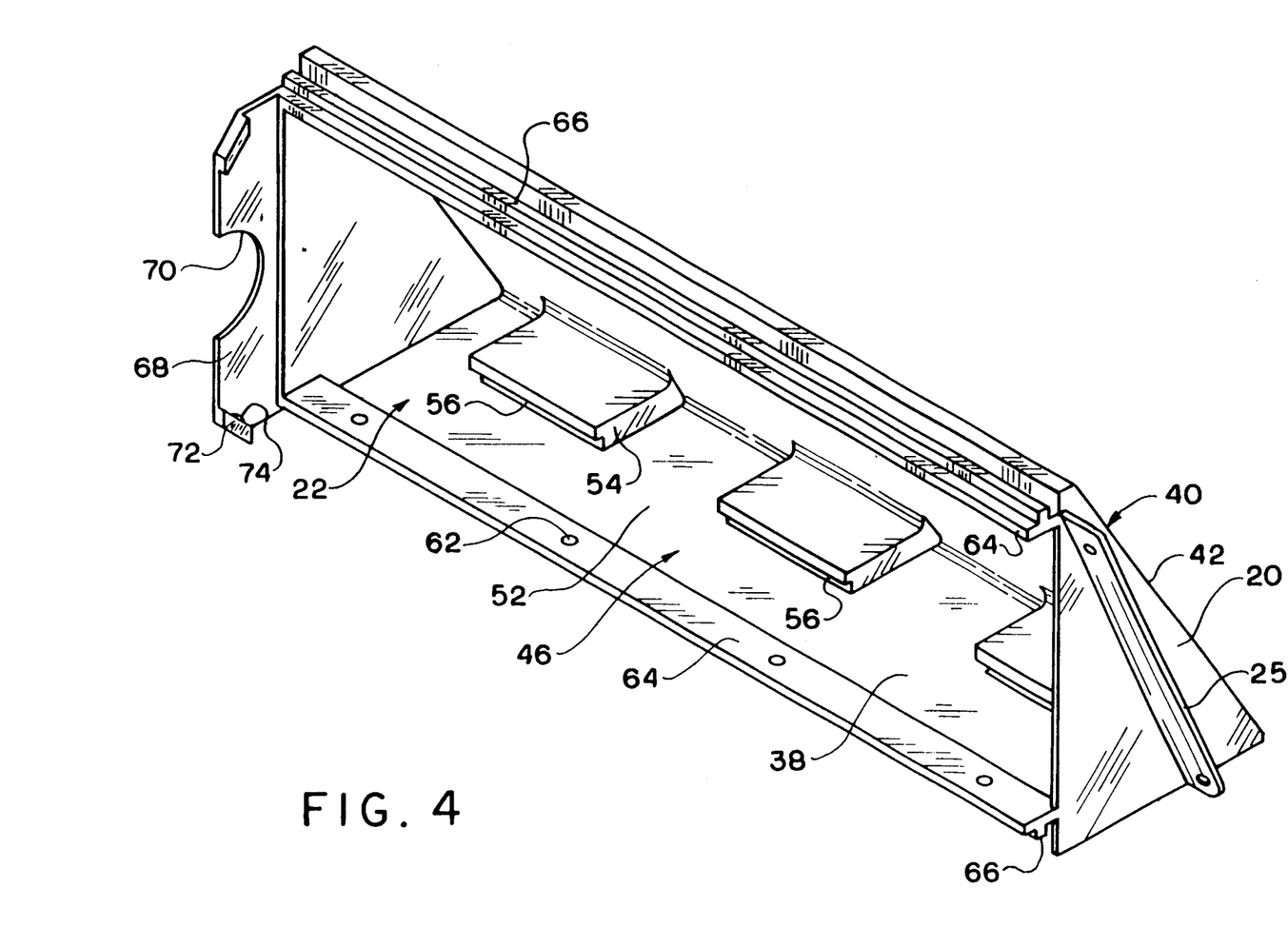
FIG. 4 is a three-dimensional illustration of a cover for an air bag module constructed according to the present invention.

The cover 20 has integral coupling means on its exterior to enable the cover 20 to be coupled to the reaction can 18. As seen in the FIGS. 4–6, the cover 20 has integrally formed flanges 64 bordering the access opening. The flanges 64 have tongues 66 extending outward from access opening 46. Moreover, the cover 20 has a rear wall 68 formed integrally with, preferably in one piece with, the rest of the cover and extending rearward from the access opening 46. The rear wall 68 has a semi-circular recess 70 and inwardly projecting flanges 72, each of which has a nib 74. The manner in which the foregoing elements enable the cover 20 to be coupled with the reaction can 18 will become apparent from the discussion below.

Figure 3:
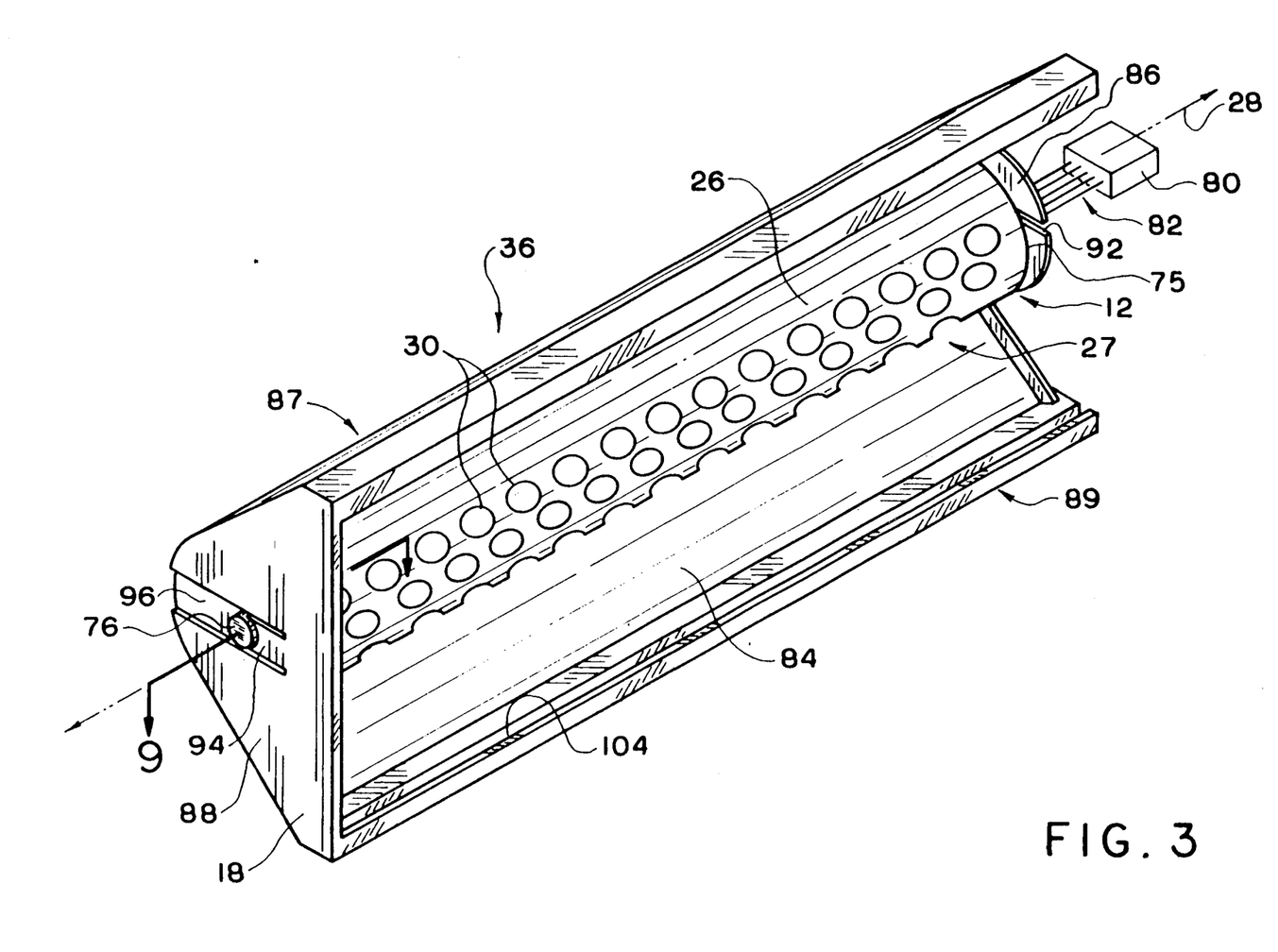
FIG. 3 is a three-dimensional illustration of an inflator/reaction device subassembly according to the invention.

The inflator/reaction device subassembly 36, as shown in FIG. 3, consists of the inflator 12 and the reaction can 18. The inflator 12 has spaced apart end walls 75 at opposite ends of the cylindrical housing 26, and a pair of integral shafts, each of which extends outward from a respective end wall 75 and along the central axis 28. One shaft (not shown) has a hollow interior adapted to receive an initiator or squib (not shown) for actuating the inflator 12. The second shaft 76, extends from the end wall 75 at the opposite end of the cylindrical housing 26. At the onset of collision, a sensor, shown schematically at 80, causes electrical signals to be sent to the squib via electrical connections or wires, shown schematically at 82. The electrical signals detonate the squib, which in turn actuates the inflator 12, as is well known to those in the art.

The reaction can 18 basically comprises a main body portion 84 and a pair of side walls 86, 88. The main body portion 84 defines a central trough-shaped cavity 27, designed to surround a portion of the inflator 12. The main body portion 84 defines a closed end 87 and an open end 89.

Figure 2:
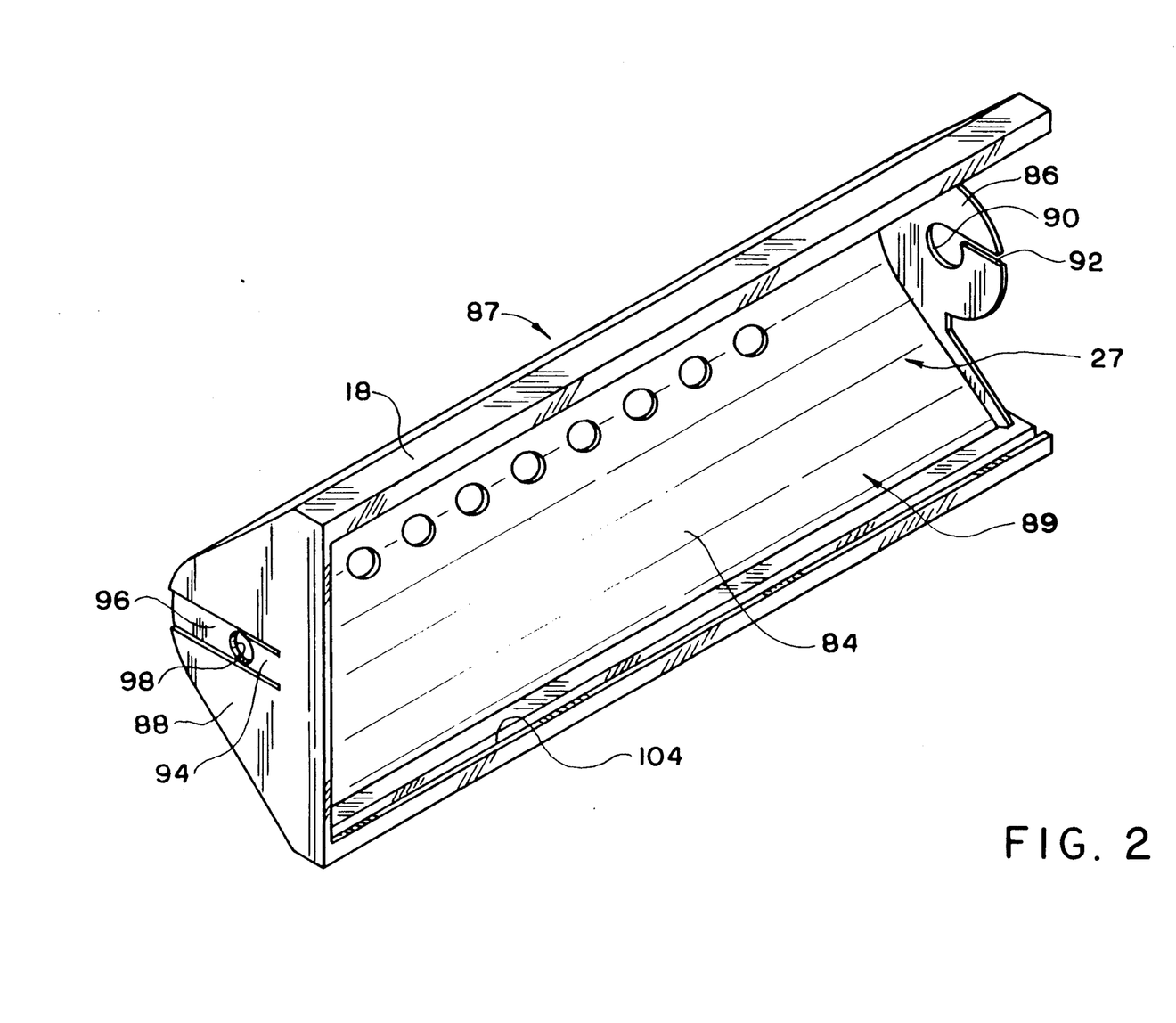
FIG. 2 is a three-dimensional illustration of a reaction can for an air bag module constructed according to the principles of the present invention.

The side walls 86, 88 of the reaction can 18 are designed to couple the inflator 12 to the reaction can 18. Specifically, as shown in FIG. 2, the side wall 86 has a generally circular shape with a circular opening 90 and a slot 92 extending from the circular opening 90 to the perimeter of the side wall 86. The circular opening 90 is adapted to receive the hollow shaft on one side of the inflator 12. The slot 92 is adapted to receive the electrical connections 82 for connecting the squib to the sensor 80. The side wall 88 is adapted to receive the shaft 76 in a manner which retains the inflator 12 coupled with the reaction can 18. Specifically, the side wall 88 has a resiliently deflectable wall portion 94. The resiliently deflectable wall portion 94 cooperates with another wall portion 96 to define a circular opening 98 for receiving the shaft 76. The wall portions 96, 98 are slightly offset along the central axis 28 (see FIG. 9). Also, the resiliently deflectable wall portion 94 has a ramp surface 100 disposed at an acute angle to the central axis 28.

In forming the inflator/reaction device subassembly, the inflator 12 is connected with the reaction can 18 by initially inserting the electrical wires 82 through slot 92, while inserting the one hollow shaft at one end of the inflator 12 into the circular opening 90 in the side wall 86, and then pivoting the inflator 12 so that the second shaft 76 pivots toward the closed end 87 of the reaction can 18. As the shaft 76 pivots toward the closed end 87 of the reaction can 18, the shaft 76 engages the ramp surface 100 on the resiliently deflectable wall portion 94. Continued movement of the shaft 76 toward the closed end 87 of the reaction can 18 deflects the side wall portion 94 outward and enables the shaft 76 to clear the side wall portion 94 and move into the opening 98. When the shaft 76 clears the resiliently deflectable wall portion 94, and moves into engagement with the wall portion 96, the resiliently deflectable wall 94 snaps back, under its bias, to its original position, thereby capturing the shaft 76 within the opening 98. In its original position, the wall portion 94 blocks the shaft 76 from being removed from the side wall 88. Thus, the inflator 12 is coupled to the reaction can 18 by means of structure integrally formed with the reaction can 18.

As further seen from FIGS. 2, 3 and 8, the reaction can 18 has internal grooves 102, 104 formed in the top and bottom portions of part of the main body portion 84 defining the front opening 89. The internal grooves 102, 104 are designed to receive the outwardly extending tongues 66, 68 on the flanges 64 of the cover 20, to enable the reaction can 18 to be coupled to the cover 20. Further, the outer surface of the reaction can 18 has a pair of recesses 108 adapted to receive respective nibs 74 on the flanges 72 of the rear wall 68 of the cover 20. The engagement of the recesses 108 and nibs 74, shown in phantom in FIG. 8, provides additional support structure to maintain the reaction can 18 coupled to the cover 20. Thus, the reaction can 18 and the cover 20 can be coupled together by sliding the outwardly extending tongues 66, 68 on the cover into the internal grooves 102, 104 on the reaction can 18, and then inserting the nibs 74 into the recesses 108 on the outside of the reaction can 18. The reaction can 18 and the cover 20 are coupled together, in the foregoing manner, to couple the inflator/reaction device subassembly 36 to the air bag/cover subassembly to complete the air bag module 10.

The reaction can 18 is preferably formed entirely in one piece from a high heat resistant plastic, such as a plastic manufactured and sold by General Electric Company of Schenectady, N.Y., under the tradename "Supec". The use of such plastics enables the cover 20 and the reaction can 18 to be made efficiently, e.g. by conventional processes such as injection molding. Moreover, such plastics are lighter in weight than the metals which have heretofore been used to form reaction cans 18, and may result in overall reduction in module cost due to the simplified processing of the plastic components. Thus, the use of such plastics in the module components results in a relatively inexpensive and lightweight module.

Moreover, it should be noted that the flanges 25 extend outward from the side walls of the cover 20 to correspond to the individual mounting structure of the vehicle. Once the subassemblies have been coupled together to form the module 10, the flanges 25 are adapted to be bolted to a structural part of a vehicle, in order to couple the module to the vehicle. Thus in this particular case, the reaction can 18 takes up the reaction forces and transmits such forces to the cover 20, which then transmits such forces to the vehicle structure to stabilize the air bag module during deployment of the air bag.

Additionally, it should be noted that when the various components are assembled to form the module 10, the U-shaped recesses 56 which receive the relatively rigid border rim 51 face the gas dispensing nozzles 30 of the inflator 12. Thus, as gas is directed into the air bag 14, the forces applied to the border rim 51 tend to force the border into the U-shaped recesses 56. This feature helps to maintain the border rim 51 engaged with the cover as the air bag 14 is being deployed.

Also, as seen from the foregoing discussion, the inflator/reaction device subassembly 36 can be standardized for use with air bag/cover subassemblies having different external configurations. Thus, the inflator/reaction can subassembly 36 can be standardized and used to form modules for various makes and styles of vehicles. Further, certain components of the air bag/cover subassembly 34 can also be standardized, so that the essential outer element of the module, i.e. the cover, is the only component of the module that needs to be specially configured to conform to a particular vehicle make and style. Additionally, such standardization facilitates the replacement of used, deployed modules with new modules.

Further, it should be clear from the foregoing discussion that each of the air bag/cover subassembly and the inflator/reaction device subassembly is made by connecting various components directly to each other, without the need for bolts or other fasteners, or for any welding to connect the various parts. This structure is designed to simplify the assembly process by reducing labor requirements to assemble the module, and also to facilitate automation and mass production of the various subassemblies.

Still further, as will be appreciated by those in the air bag art, the foregoing concepts also enable the inflator to be transported separately from the air bag/cover subassembly or even from the reaction cans if desired. Thus, if there is accidental ignition of a live inflator in transport, the only damage is to the one inflator/reaction device subassembly or other inflator/reaction device subassemblies transported therewith, and not to other components of the module. Again, this is a feature that enhances the overall efficiency of module assembly.

With the foregoing disclosure in mind, it is believed that further obvious features and advantages of the present invention will become further apparent to one of ordinary skill in the art.

We claim:

1. Apparatus comprising:
    an air bag/cover subassembly and an inflator/reaction device subassembly adapted to be coupled to said air bag/cover subassembly to form an air bag module;
    said air bag/cover subassembly comprising a cover defining an air bag cavity and an access opening, a folded air bag disposed within said air bag cavity, and a retaining device adapted to maintain said air bag in said cavity, said retaining device directly engaging a portion of said cover to couple said retaining device with said cover and to maintain said air bag in said cavity, said cover having portions adapted to separate to create a deployment opening through which the major portion of said air bag can be forced under pressure out of said cavity;
    said inflator/reaction device subassembly comprising an inflator and a reaction device coupled to said inflator;
    each of said inflator/reaction device subassembly and said air bag/cover subassembly having respective integral coupling means adapted for directly coupling with each other to couple said inflator/reaction device subassembly with said air bag/cover subassembly to form the air bag module.

2. Apparatus as defined in claim 1 wherein said cover has means defining a first internal recess formed integrally therewith, said folded air bag having a relatively rigid rim portion, said relatively rigid rim portion of said folded air bag being received in said first internal recess in said cover, said first internal recess being oriented so as to retain said relatively rigid rim portion of said air bag therein as said air bag is being forced through said deployment opening and out of said cavity.

3. Apparatus as defined in claim 2 wherein said cover has means defining at least one second internal recess formed integrally therewith, said retaining device being partially received in said at least one second internal recess to couple said retaining device with said cover.

4. Apparatus as set forth in claim 3 wherein said retaining device has a screen-like configuration, said retaining device being adapted to be partially received in said at least one second internal recess in a manner which applies forces to said retaining device to bias said retaining device into said at least one second internal recess, thereby enabling said retaining device to be securely coupled to said cover.

5. Apparatus as set forth in claim 4 wherein said cover has a pair of integral opposed flanges located at said access opening, said at least one second internal recess being formed in said pair of integral opposed flanges, and said first internal recess being located so as to face said access opening in said cover.

6. Apparatus as set forth in claim 5 wherein said reaction device includes integral coupling structure formed in one piece with said reaction device which directly engages said inflator and couples said inflator to said reaction device.

7. Apparatus as set forth in any of claims 1-6 wherein said reaction device comprises a wall with a resiliently deflectable portion, said resiliently deflectable portion being biased to a predetermined position, said resiliently deflectable portion adapted to be engaged by a portion of said inflator and to deflect resiliently to allow insertion of said inflator into a predetermined orientation relative to said reaction device, said resiliently deflectable portion being adapted to return to said predetermined position when said inflator is in said predetermined orientation relative to said reaction device, and said resiliently deflectable portion when in said predetermined position being adapted to maintain said inflator in said predetermined orientation.

8. Apparatus as set forth in claim 7 wherein said inflator comprises a cylindrical housing circumscribing a central axis, said portion of said inflator comprising a shaft extending outward of said cylindrical housing and along said central axis.

9. Apparatus as set forth in claim 8 wherein said reaction device comprises a reaction can with a pair of spaced apart side walls, one of said pair of spaced apart side walls having said resiliently deflectable portion formed integrally therein.

10. Apparatus as set forth in claim 9 wherein said inflator has another shaft extending outward of said cylindrical housing and along said central axis, the other of said pair of spaced apart side walls in said reaction can having an opening for receiving said another shaft portion of said inflator.

11. Apparatus as set forth in claim 1 wherein said cover and said reaction device have respective integrally formed coupling portions adapted to be coupled directly to each other to couple said inflator/reaction device subassembly to said air bag/cover subassembly.

12. Apparatus as set forth in claim 11 wherein said coupling portions are preferably formed of one piece with their respective cover and reaction device, and comprise a recess in one of said cover and said reaction device and a mating tongue integral with the other of said cover and reaction device and adapted to be inserted into said recess to couple said cover to said reaction device.

13. Apparatus as defined in claim 1 wherein said cover includes mounting flanges adapted to be coupled to a structural part of vehicle.

14. Apparatus comprising an air bag/cover subassembly adapted to be coupled to an inflator/reaction device subassembly to form an air bag module;
said air bag/cover subassembly comprising a cover defining an air bag cavity and an access opening, a folded air bag disposed in said air bag cavity, and a retainer device for maintaining the folded air bag in said air bag cavity;
said cover having portions adapted to separate to create a deployment opening through which the major portion of said air bag can be forced under pressure out of said cavity;
said retainer device having integral coupling means directly engaging a portion of said cover to couple said retainer device to said cover when said folded air bag is disposed in said cavity.

15. Apparatus as set forth in claim 14 wherein said folded air bag has a relatively rigid rim portion and said cover has a means defining a first internal recess formed integrally therewith for receiving said relatively rigid rim portion, said first internal recess being oriented so as to retain said relatively rigid rim portion therein as said air bag is being forced through said deployment opening and out of said cavity.

16. Apparatus as defined in claim 15 wherein said cover has means defining at least second internal recess formed integrally therewith said retaining device being partially received in said at least one second internal recess to couple, said retaining device with said cover.

17. Apparatus as set forth in claim 16 wherein said retaining device has a screen-like configuration, said retaining device being adapted to be partially received in said at least one second internal recess means in a manner which applies forces to said retaining device which bias said retaining device into said second internal recess, thereby enabling said retaining device to be securely coupled to said cover.

18. Apparatus as set forth in claim 17 wherein said cover has a pair of integral opposed flanges located at said access opening, said second internal recess means being formed in said pair of integral opposed flanges, and said first internal recess means being located so as to face said access opening in said cover.

19. Apparatus as set forth in any of claims 14-18, wherein said cover is formed in one piece of plastic.

20. Apparatus as defined in claim 14 wherein said cover includes mounting flanges adapted to be coupled to a structural part of vehicle.

21. Apparatus comprising an inflator/reaction device subassembly which is adapted to be coupled to an air bag/cover subassembly to form an air bag module;
said inflator/reaction device subassembly comprising an inflator having gas dispensing nozzles, and a reaction device coupled with said inflator;
said reaction device having a resiliently deflectable coupling structure integrally formed therewith, said coupling structure adapted to engage a portion of said inflator and to couple said reaction device directly to said inflator.

22. Apparatus as set forth in claim 21 wherein said reaction device is formed of plastic.

23. Apparatus comprising an inflator/reaction device subassembly which is adapted to be coupled to an air bag/cover subassembly to form an air bag module;
said inflator/reaction device subassembly comprising an inflator having gas dispensing nozzles, and a reaction device coupled with said inflator;
said reaction device having coupling structure integrally formed therewith, said coupling structure adapted to engage a portion of said inflator and to couple said reaction device directly to said inflator;
wherein said reaction device comprises a wall and said coupling structure comprises a resiliently deflectable portion formed in one piece with said wall, said resiliently deflectable portion of said wall being biased to a predetermined position, said resiliently deflectable portion of said wall adapted to be engaged by a portion of said inflator and to deflect resiliently to allow insertion of said inflator into a predetermined orientation relative to said reaction device, said resiliently deflectable portion of said wall being adapted to return to said predetermined position when said inflator is in said predetermined orientation relative to said reaction device, said resiliently deflectable portion of said wall when in said predetermined position being adapted to maintain said inflator in said predetermined orientation relative to said reaction device.

24. Apparatus as set forth in claim 23 wherein said inflator comprises a cylindrical housing circumscribing a central axis, said portion of said inflator comprising a shaft extending outward of said cylindrical housing and along said central axis.

25. Apparatus as set forth in claim 24 wherein said reaction device comprises a reaction can with a pair of spaced apart side walls, one of said pair of spaced apart side walls having said resiliently deflectable portion formed integrally therein.

26. Apparatus as set forth in claim 25 wherein said inflator has another shaft extending outward of said cylindrical housing and along said central axis, the other of said pair of spaced apart side walls in said reaction can having an opening for receiving said another shaft portion of said inflator.

27. Apparatus as set forth in any of claims 23-26 wherein said reaction device is formed of plastic.

28. Apparatus comprising:
an air bag/cover subassembly and an inflator/reaction device subassembly adapted to form an air bag module;
said air bag/cover subassembly comprising a cover formed of high impact resistant plastic defining an air bag cavity and an access opening, a folded air bag disposed within said air bag cavity, and a retaining device adapted to maintain said air bag in said cavity, said retaining device directly engaging a portion of said cover to couple said retaining device with said cover and to maintain said air bag in said cavity, said cover having portions adapted to separate to create a deployment opening through which the major portion of said air bag can be forced under pressure out of said cavity; and
said inflator/reaction device subassembly comprising an inflator and a reaction device formed of high heat resistant plastic and coupled to said inflator.

29. Apparatus as defined in claim 28 wherein said cover includes mounting flanges adapted to be coupled to a structural part of vehicle.

30. Apparatus comprising:
an air bag/cover subassembly and an inflator/reaction device subassembly adapted to form an air bag module;
said air bag/cover subassembly comprising a cover formed of high impact resistant plastic defining an air bag cavity and an access opening, a folded air bag disposed within said air bag cavity, and a retaining device adapted to maintain said air bag in said cavity, said retaining device directly engaging a portion of said cover to couple said retaining device with said cover and to maintain said air bag in said cavity, said cover having portions adapted to separate to create a deployment opening through which the major portion of said air bag can be forced under pressure out of said cavity; and
said inflator/reaction device subassembly comprising an inflator and a reaction device coupled to said inflator.

31. An air bag module comprising a reaction device, an inflator coupled to said reaction device, a cover connected to said reaction device and a folded air bag;
said cover defining an air bag cavity and an access opening, said folded air bag being disposed in said air bag cavity;
said cover including a retainer device for maintaining said folded air bag in said air bag cavity;
said cover having portions adapted to separate to create a deployment opening through which the major portion of said air bag can be forced under pressure out of said cavity;
said retainer device having integral coupling means directly engaging a portion of said cover to couple said retainer device to said cover when said folded air bag is disposed in said cavity.

* * * * *